Oct. 21, 1969   L. A. KILGORE ET AL   3,474,323
ELECTRICAL CONTROL SYSTEMS WITH STABILIZING CONTROL MEANS
Filed Dec. 28, 1966   3 Sheets-Sheet 1

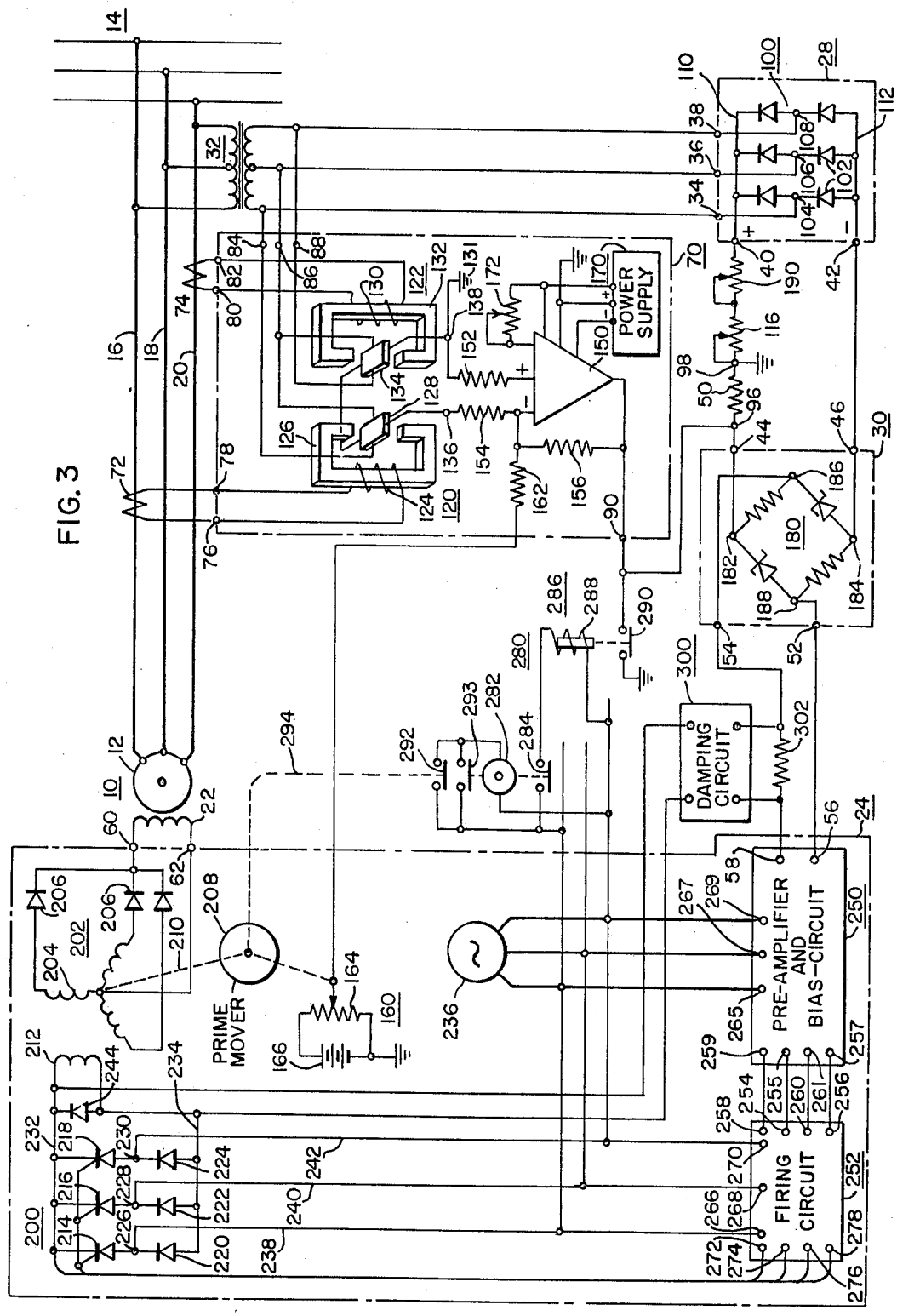

United States Patent Office 3,474,323
Patented Oct. 21, 1969

3,474,323
ELECTRICAL CONTROL SYSTEMS WITH STABILIZING CONTROL MEANS
Lee A. Kilgore, Export, and Frederick W. Keay, Irwin, Pa., assignors to Westinghouse Electric Corporation, Pittsburgh, Pa., a corporation of Pennsylvania
Filed Dec. 28, 1966, Ser. No. 605,244
Int. Cl. H02h 7/06; H02p 11/04
U.S. Cl. 322—19                10 Claims

ABSTRACT OF THE DISCLOSURE

A control system for a dynamoelectric machine, including stabilizing means responsive to instantaneous changes in the real power output of the machine due to transient system disturbances. The stabilizing means provides a signal which opposes and substantially cancels the action of the voltage regulator during these transient conditions, to prevent the voltage regulator from feeding energy into the rotor oscillation caused by the system disturbance.

---

Figure 1:
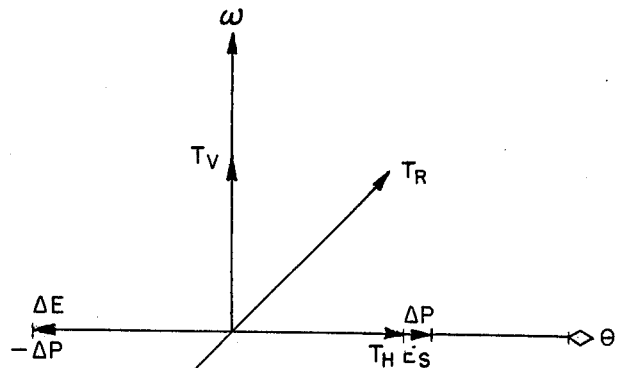

In electrical power systems having a plurality of interconnected synchronous generators, system disturbances, such as those due to transient faults, lightning, switching large blocks of power on or off of the system, and other factors which may change the system impedance, give rise to torsional oscillations of the rotors of the alternating current generators. The rotor oscillations occur at a frequency corresponding to the natural frequency of the system, which is normally between ½ and 2 cycles per second, and is determined by the inertia and synchronizing power between the alternating current generators.

The torsional oscillation of a generator rotor will normally be dampened by the positive damping action inherent in the internal circuits and construction of the generator. Under certain system conditon, however, such as when high impedance transmission lines connect a generator with loads and other generators, it is possible for the voltage regulator of an alternating current generator to effectively cancel the inherent damping of the machine. Thus, the rotor oscillations may be sustained for an objectionably long period of time, which may adversely affect certain types of loads connected to the system, and they may increase in magnitude to the point where the angular position of the rotor of the generator relative to that of the power system, called the load angle, exceeds a certain critical value beyond which the generator falls out of synchronism and must be removed from the system.

The cancellation of the inherent damping of an alternating current generator is most likely to occur in power systems involving the transmission of large blocks of power over long transmission lines, and with a generator which has a high performance, fast acting voltage regulator. While it is often possible to minimize this effect by changing the parameters of the voltage regulating system, this results in degrading the response time of the voltage regulator, without insuring that net positive damping will be available during system disturbances.

Accordingly, it is an object of the invention to provide a new and improved electrical control system for dynamoelectric machines.

Another object of the invention is to provide a new and improved electrical control system for an alternating current generator which enables the inherent damping of the generator to dampen rotor oscillations due to transient disturbances.

Still another object of the invention is to provide a new and improved electrical control system for an alternating current generator, incuding stabilizing means which enables the inherent damping of the generator to dampen transient rotor oscillations, without degrading the performance of the generator's voltage regulator system.

Briefly, the present invention accomplishes the above cited objects by providing an electrical control system for an alternating current generator which includes stabilizing means for preventing the generator's voltage regulator system from cancelling the inherent system damping of the generator rotor during transient system disturbances. During normal steady state operation, and during minor disturbances which involve little or no change in real output power, the voltage regulator is allowed to function normally without degradation of its transient response or adverse affect on its steady-state operation. During a system disturbance which involves a change in the real output power of the alternating current generator, a stabilizing signal is produced by the stabilizing means which is proportional to the instantaneous change in the real power output of the generator. This stabilizing signal is introduced into the voltage regulator system, with its polarity opposing the action which the voltage regulator takes in response to the system disturbance. Therefore, the stabilizing signal substantially cancels the action of the regulator, with the excitation current supplied to the field winding of the alternating current generator during the transient condition being substantially the same as the field current flowing therethrough immediately prior to the disturbance. Thus, the alternating current generator will quickly dampen rotor oscillations, without interference from the regulator system.

Figure 2:
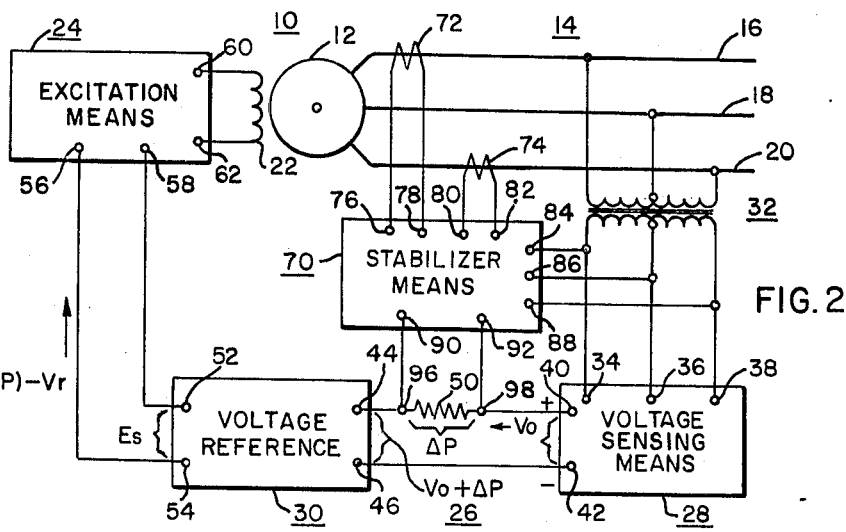
Figure 2A:
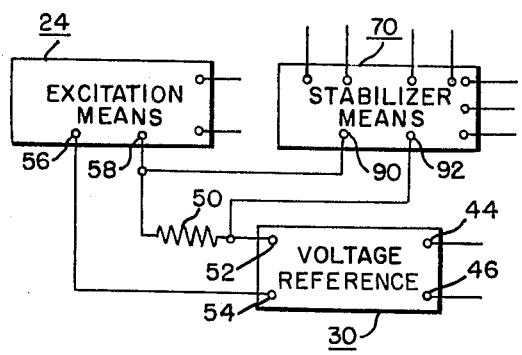
Figure 4:
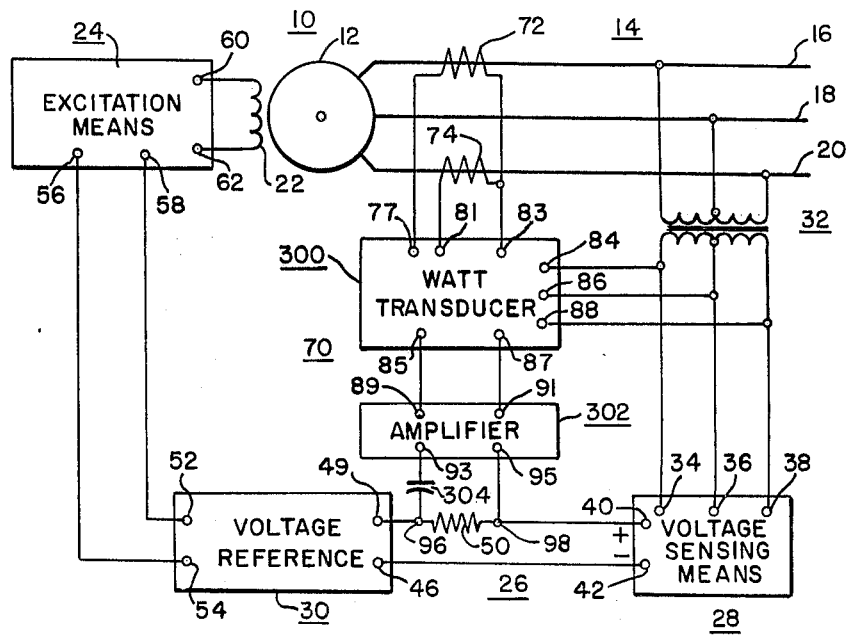

Further objects and advantages of the invention will become apparent from the following detailed description, taken in connection with the accompanying drawings, in which:

FIG. 1 is a vector diagram illustrating the various parameters which oscillate at the natural frequency of an alternating current generator during a disturbance on the electrical system, FIG. 2 is a diagrammatic representation which illustrates the teachings of the invention, FIG. 2A is a diagrammatic representation which illustrates a modification of the system shown in FIG. 2, FIG. 3 is a diagrammatic representation illustrating a specific embodiment of the invention; and FIG. 4 is a diagrammatic representation illustrating another embodiment of the invention.

Referring now to the drawings, and FIG. 1 in particular, there is shown a vector diagram of the various quantities associated with an alternating current generator which oscillate at the frequency of the rotor oscillation during a system disturbance. The vector diagram of FIG. 1 illustrates how voltage regulator action may cancel all or part of the inherent damping of the torsional oscillations of the generator during a transient disturbance on the electrical power system.

Assuming the transient condition is a sudden increase in load, the load angle of an alternating current generator connected to the electrical system increases, which reduces the terminal or output voltage of the alternating current generator. The corrective action of the voltage regulator associated with the alternating current generator would be to increase the exciter voltage to increase the field excitation current, which is turn would increase the load torque and slow the rotor of the alternating current generator. If these actions were all instantaneous, the effect on the low frequency oscillation would be a torque directly opposed to angular displacement of the rotor, which would increase the synchronizing torque. However, since these actions are not instantaneous, and since the field winding of the alternating current generator has a relatively long time constant, the resulting torque from the regulator action substantially lags the desired position, and results in a component of torque which is in phase with the angular velocity $\omega$ of the rotor, which leads the rotor angle $\theta$ by 90°. The result is energy fed into the oscillation, and less efficient damping of the rotor oscillation. With an alternating current generator having a high performance voltage regulator system, connected to an electrical system having long transmission lines between generating sources, it may even result in net negative damping, which increases the amplitude of the oscillations until the generator falls out of synchronism with the rest of the electrical system. These relationships for a sudden increase in load are shown in the vector diagram of FIG. 1, which illustrates the parameters which oscillate at the natural frequency of the alternating current generator and electrical system, which is usually between ½ and 2 cycles per second. The rotor angle $\theta$ is illustrated at 0° angle, the angular velocity $\omega$, which is equal to the time rate of change of the rotor angle $\theta$, leads the rotor angle by 90 degrees. The terminal voltage change $\Delta E$, which is a change in the decreasing direction, is of opposite polarity to the rotor angle $\theta$, which is increasing. The error signal $E_S$ is proportional to the change in terminal voltage $\Delta E$, and its polarity is opposite to that of the change in terminal voltage $\Delta E$. The error signal $E_S$ from the voltage regulator will attempt to increase the excitation of the generator. The field current $I_R$ resulting from the error signal $E_S$ lags the error signal $E_S$ by 90° or more, due to the inherent delays in the system, including the time constant of the field winding, and the resulting torque $T_R$, which is 180° out of phase with the resulting field current $I_R$, has a component $T_V$ which is in phase with the angular velocity $\omega$, thus adding energy to the oscillation and interfering with the inherent damping action of the alternating current generator.

The change in instantaneous power output $\Delta P$ is directly proportional to the change in rotor angle $\theta$. Therefore, in accordance with the teachings of the invention, a stabilizing signal proportional to an instantaneous increase in real power $\Delta P$ is applied to decrease the excitation applied to the field winding of the alternating current generator. Thus, the action of the stabilizing signal has an affect on the field current which is opposite to the affect on the field current provided by the error signal $E_S$. These effects may be made to exactly cancel, or, the effect of the stabilizing signal may be adjusted to more than cancel the effect of the error signal, in order to offset other negative damping influences, such as the primary resistance of the system, including the transmission line, and the governor on the generator prime mover. The stabilizing signal, which may be called $-\Delta P$ because it is proportional to the change in power but of opposite polarity, thus enables the voltage regulator to "ride over" transient disturbances, without introducing negative damping. The stabilizing circuitry is only activated during a transient system disturbance involving a change in the instantaneous real power output of the alternating current generator, and thus does not affect the normal operation of the voltage regulator system, nor is any degrading of the voltage regulator system required.

If the transient condition is a sudden decrease in load, instead of a sudden increase, which was just described, the corrective action of the voltage regulator may also interfere with the normal damping of the alternating current generator, and may even increase the amplitude of the oscillations. When the load suddenly decreases, the load angle decreases, which increases the terminal or output voltage of the alternating current generator. The vector diagram of FIG. 1 may still be used by merely rotating the entire diagram 180 degrees, as the direction of the change in terminal voltage $\Delta E$ will still be opposite to the direction of the change in rotor angle $\theta$, the change in power $\Delta P$ will be in the decreasing direction, and therefore, in phase with the rotor angle $\theta$. The error signal $E_S$ will be opposite to the change in terminal voltage $\Delta E$, and the resulting torque $T_R$ will still provide a component $T_V$ which adds energy into the rotor oscillator.

FIG. 2 is a block diagram illustrative of the invention, in which an alternating current generator 10 having an armature 12 is disposed to supply electrical energy through output conductors 16, 18 and 20 to transmission line 14. Alternating current generator 10 has a field winding 22 connected to receive a predetermined excitation voltage from excitation means 24. The excitation potential, and hence the excitation current flowing through field winding 22, is controlled by regulating system 26, which includes voltage sensing means 28, and voltage reference means 30. Voltage sensing means 28 obtains a measure of the instantaneous terminal voltage of alternating current generator 10 through potential transformer means 32, and this signal is applied to its input terminals 34, 36 and 38. This alternating current signal is rectified in voltage sensing means 28, with the unidirectional sensing signal $V_0$ appearing at its output terminals 40 and 42. Output terminal 40 is more positive than output terminal 42, due to the normal rectifier action of voltage sensing means 28.

Output terminals 40 and 42 of voltage sensing means 28 are connected to the input terminals 44 and 46 of voltage reference means 30, through an impedance or resistance means 50. The signal applied to input terminals 44 and 46 of voltage reference means 30 is compared with a voltage reference, and any difference appears at output terminals 52 and 54 as a polarized error signal $E_S$. The error signal $E_S$, if any, is applied to input terminals 56 and 58 of excitation means 24, and the excitation voltage appearing at output terminals 60 and 62 of excitation means 24 is changed as directed by the magnitude and polarity of error signal $E_S$.

In order to prevent voltage regulator system 26 from interfering with the inherent damping action of alternating current generator 10 during transient system disturbances, stabilizer means 70 is connected to modify the output signal $V_0$ of voltage sensing means 28 with a signal proportional to the change in instantaneous power output of the alternating current generator, and with a polarity responsive to the direction of power change. Stabilizer means 70 senses the instantaneous output current of alternating current generator 10 through current transformer means 72 and 74, which are connected to its input terminals 76 and 78, and 80 and 82, respectively. Stabilizer means 70 senses the instantaneous output voltage of alternating current generator 10 through potential transformer means 32, connected to its input terminals 84, 86 and 88. Stabilizer means 70 obtains the product of the instantaneous current component which is in phase with the voltage, and the instantaneous voltage, and provides a unidirectional output signal at output terminals 90 and 92, when the instantaneous real power output of the alternating current generator is either increasing or decreasing. The polarity of the output signal at terminals 90 and 92, is dependent upon whether the change in power is in the increasing or decreasing direction. If the instantaneous real power output is increasing terminal 90 will be positive with respect to terminal 92. If the instantaneous real power output is decreasing, terminal 90 will be negative with respect to terminal 92.

Terminal 90 is connected to resistance means 50 at terminal 96, and terminal 92 is connected to resistance means 50 at terminal 98. Thus, when the load angle of the generator 10 increases, the terminal voltage decreases, the instantaneous power output increases, and terminal 96 of resistance means 50 is more positive than terminal 98. The signal applied to resistance means 50 is thus added to the signal $V_0$ from voltage sensing means 28. The signal applied to voltage reference means 30, therefore, can be substantially the same magnitude during the fault as just prior to the fault, even though the terminal voltage has dropped, due to the stabilizing signal being added to the voltage sensing signal.

When the load angle of generator 10 decreases, the output or terminal voltage of generator 10 increases, and the instantaneous power output decreases, terminal 96 of resistance means 50 will be negative with respect to terminal 98. The signal applied to resistance means 50 is thus substracted from the voltage sensing signal $V_0$, resulting in a modified signal which may be tailored to be substantially the same as the signal before the appearance of the transient disturbance.

Thus, regardless of whether the transient disturbance causes the output voltage of alternating current generator 10 to increase or decrease, stabilizer means 70 can prevent the transient condition from influencing the value of the error signal $E_S$, and the inherent damping action of the alternating current generator on rotor oscillations is allowed to influence the rotor and dampen the oscillations without interference from the regulator system 26.

FIG. 2A illustrates a modification of the control system shown in FIG. 2, with resistance means 50 being connected to modify the error signal $E_S$, instead of the voltage sensing signal $V_0$. In other words, the stabilizer signal may be injected into the voltage regulator system at any convenient point, and may modify either the voltage sensing signal, or the error signal.

FIG. 3 is a schematic diagram illustrating a specific embodiment of the invention, with like reference numerals in FIGS. 2, 2A and 3 indicating like components. Voltage sensing means 28 may be a three-phase bridge type rectifier 100 having a plurality of rectifier devices or diodes 102 connected to form three legs having input terminals 104, 106 and 108, respectively. The legs of the bridge rectifier are connected between conductors 110 and 112, which are connected to the positive and negative output terminals 40 and 42, respectively. Input terminals 104, 106 and 108 of bridge rectifier 100 are connected to input terminals 34, 36 and 38 respectively, of voltage sensing means 28.

The unidirectional voltage appearing across output terminals 40 and 42 of voltage sensing means 28 is applied to input terminals 44 and 46 of voltage reference means 30, through adjustable resistance means 116 and 190 and resistance means 50. Resistance means 50 will have a voltage developed across it during system disturbances involving changes in the output power of the alternating current generator, with the voltage across resistance means 50 either adding to, or substracting from, the voltage across output terminals 40 and 42, depending upon whether the system disturbance caused the output voltage of alternating current generator 10 to fall or rise. During normal steady-state operation, stabilizer means 70 will not provide an output signal, and the voltage regulator means will function without modification from the stabilizer means. Adjustable resistance means 116 and 119 may be used to set the range of voltage adjustment, and to set the voltage in that range, respectively.

Stabilizer means 70 may be any means which will provide a polarized unidirectional signal proportional to the change in the real power output of alternating current generator 10. For example, as shown in FIG. 3, stabilizer means 70 may include a watt transducer arrangement for measuring three-phase power, which utilizes two Hall generators 120 and 122, and an operational amplifier 150. More specifically, Hall generator 120 includes a flux producing coil 124 disposed on a gapped magnetic core structure 126, and a Hall plate 128 disposed in the gap of the magnetic core structure. Coil 124 is energized from current transformer 72 disposed to measure the instantaneous current flow in one of the output conductors of alternating current generator 10, such as conductor 16. Two predetermined opposite ends of Hall plate 128 are connected to be responsive to the output potential across one of the phases of potential transformer means 32. The remaining opposite ends of Hall plate 128 provide the unidirectional output potential, with one of the ends being connected to terminal 136, and the other end being connected to the Hall plate of Hall generator 122, to add the voltages of the two Hall generators 120 and 122.

Hall generator 122 includes a flux producing coil 130 disposed on a gapped magnetic core structure 132, and a Hall plate 134 disposed in the gap of the magnetic core structure. Coil 130 is energized from current transformer 74 disposed to measure the instantaneous current flow in another of the output conductors of alternating current generator 10, such as conductor 20. Two predetermined opposite ends of Hall plate 134 are connected to be responsive to the output potential across another of the phases of potential transformer means 32. The remaining opposite ends of Hall plate 134 provide the unidirectional output potential, with one of the ends being connected to terminal 138, and the other of its ends being connected to the Hall plate 128, to add their unidirectional voltages.

This system for measuring three-phase instantaneous real power is disclosed in United States Patent 3,054,952, issued Sept. 18, 1962.

The output potential of the three-phase watt transducer arrangement is responsive to the instantaneous real power output of alternating current generator 10, and hence its output voltage always has the same polarity. This output voltage must now be changed to a signal which has a magnitude proportional to the change in real power, and a polarity which indicates whether the change is increasing or decreasing. This function may be accomplished by operational amplifier 50, which is balanced to provide a zero output when the output power of alternating current generator 10 corresponds to the input power provided by the prime mover 208 of the alternating current generator 10, a positive output signal at terminal 90, with respect to ground, when the power falls below the balance point, and a negative output signal at terminal 90 with respect to ground, when the power output exceeds the predetermined balanced point. The operational amplifier is automatically biased by a signal responsive to the power input to the alternating current generator 10, in order to automatically select the predetermined balance point, regardless of changes in the input power. An operational amplifier which may be used is shown and described in the Apr. 1, 1963 issue of a publication entitled "The Lightning Empiricist," volume II, No. 2, published by Philbrick Researches, Incorporated, and is identified as their Model P45 operational amplifier.

Terminal 138 of the watt transducer is connected to the positive input of operational amplifier 150 through resistance means 152, and this input to the operational amplifier is grounded at 131. Terminal 136 of the watt transducer is connected to the negative input of operational amplifier 150 through resistance means 154. The negative input terminal is also connected to the output of the operational amplifier through resistance means 156. Resistance means 154 and 156 are selected to establish the gain of the operational amplifier. The negative input terminal of the operational amplifier is also connected to a reference means shown generally at 160, through resistance means 162, to automatically set the operating level of the operational amplifier and provide a zero output from the operational amplifier regardless of the input power to the alternating current generator, as long as the power output is not affected by transient disturbances in the electrical system.

Reference means 160 is responsive to the prime mover 208 of alternating current generator 10, providing a reference unidirectional potential responsive to the level of the input power. For example, a potentiometer 164 may be responsive to the valve on a turbine, or the gate on a waterwheel, to adjust the output magnitude of a source 166 of unidirectional potential.

A balance input to the operational amplifier 150 may be connected to the positive terminal of a power supply 170 through an adjustable resistor 172, with the resistor 172 being utilized to balance the operational amplifier to provide zero output under steady-state conditions with a predetermined input signal. Once this resistor is adjusted for a particular power input setting, no further adjustment is required, as the reference signal from the prime mover will maintain the operational amplifier at its balance point under steady-state conditions for any level of power input.

Power supply 170 has its positive and negative output terminals, and grounded common, connected to provide the dual potential necessary for the operation of operational amplifier 150.

The voltage sensing signal $V_0$, which is unmodified during steady-state operation of alternating current generator 10, and modified by the stabilizing signal during transient system disturbances involving a change in the instantaneous real power output of the alternating current generator, is applied to voltage reference means 30, which may be a conventional Zener diode type bridge arrangement 180, having input terminals 182 and 184, and output terminals 186 and 188. Any deviation of the voltage applied to input terminals 182 and 184 from the reference voltage of the bridge arrangement 180, results in a polarized error signal $E_S$ at output terminals 186 and 188, which is applied to excitation means 24. Any other suitable reference means may be used such as a constant source of unidirectional potential.

While FIG. 3 illustrates the stabilizing signal being introduced to modify the voltage sensing signal $V_0$ before it is applied to voltage reference means 30, as illustrated in FIG. 2A, resistor means 50 may be connected in the output of voltage reference means 30 to modify the error signal $E_S$ during a transient condition, to maintain the magnitude and polarity of error signal $E_S$ substantially the same during the transient condition as it was immediately preceding it.

Excitation means 24 may be of any suitable type, such as magnetic amplifier, electronic, solid state, brushless, or combinations of these types. FIG. 3 illustrates a brushless excitation system, in which the exciter excitation current is supplied by a solid state bridge circuit 200, and the alternating current generator excitation current is supplied by a brushless exciter system 202. When a rotating type exciter is used, a suitable damping circuit 300 should be utilized to modify the input signal to the excitation system with a feedback signal proportional to the rate of change of the voltage applied to exciter field winding. Conventional damping circuits, using an R-C circuit to develop a negative feedback signal, and a delay which simulates the delay of the exciter, may be used. The negative feedback signal may be applied across resistor 302, connected serially between terminals 54 and 58.

The brushless exciter system 202 includes a rotating armature or power winding 204 connected, on the same shaft, to the rotating field winding 22 of alternating current generator 10, through rectifiers 206 which are also disposed on the shaft. The rotating armature 204, rectifiers 206, and field winding 22 are driven by prime mover means 208 through a suitable mechanical coupling or shaft 210.

Exciter system 202 also includes a field excitation winding 212 connected to the output terminals of static rectifier 200, which may be a three-phase bridge arrangement having a controlled rectifier and a conventional rectifier in each leg of the bridge, such as silicon controlled rectifiers 214, 216 and 218, and silicon diodes 220, 222 and 224, with controlled rectifier 214 and diode 220 being connected to form a first leg, controlled rectifier 216 and diode 222 being connected to form a second leg, and controlled rectifier 218 and diode 224 being connected to form a third leg. Each leg of the bridge circuit has an input terminal connected at the junction of the controlled rectifier and diode, such as input terminals 226, 228 and 230, respectively, and the legs of the bridge are connected between the positive and negative conductors 232 and 234, respectively. The input terminals 226, 228 and 230 are connected to a source 236 of alternating potential through conductors 238, 240 and 242. A commutating diode 244 is connected across field winding 212, in order to provide a path for the field current during the time bridge arrangement 200 is not conducting.

Controlled rectifiers 214, 216 and 218 are fired at a predetermined time in the positive voltage half cycles of the source of alternating potential 236, with the predetermined time being controlled by the error signal $E_S$ through preamplifier and bias circuit 250, and firing circuit 252. The preamplifier and bias circuit 250 receives its operating potential from source 236 at its input terminals 265, 267 and 269, and also receives error signals $E_S$ at its input terminals 58 and 56, which it amplifies and applies to input terminals 254 and 256 of firing circuit 252, from output terminals 255 and 257 of the preamplifier and bias means 250. A bias voltage for operation of firing circuit 252 is provided by preamplifier and bias means 250 at its output terminals 259 and 261, and is applied to input terminals 258 and 260 of firing circuit 252. Firing circuit 252 is connected to alternating current source 236 at its input terminals 266, 268 and 270. Firing circuit 252 provides phase modulated firing pulses at its output terminals 272, 274, 276 and 278, which are applied to the gate-cathode electrodes of controlled rectifiers 214, 216 and 218, to provide an average direct current potential and excitation current as determined by error signal $E_S$, which average excitation current will maintain the output voltage of alternating current generator 10 at the desired regulated magnitude. Suitable preamplifier and bias means 250 and firing means 252 which may be utilized, are disclosed in United States Patents 3,211,987 and 3,254,293, which are assigned to the same assignee as the present application. The stabilizer circuitry disclosed herein may also be utilized with the completely static excitation systems disclosed in the aforesaid United States patents.

In order to prevent stabilizer means 70 from affecting regulator action during a planned change in the input power provided by prime mover means 208, such as during the short interval of time when the valve of a turbine is moved to a new setting, or the gate of a waterwheel generator is moved to a new position, some means, shown generally at 280, should be provided to de-activate stabilizer means 70. De-activating means 280 may comprise a timer 282 having a normally open contact 284, a relay 286 having an electromagnetic coil 288 and a normally open contact 290, and a normally open contact 292 which is responsive to a planned change in input power through a linkage shown generally at 294. The timer is connected to a source of potential such as source 236 through contact 292, electromagnetic coil 288 of relay 286 is connected to source potential 236 through timer contact 284, and relay contact 290 is connected from the output terminal 90 of operational amplifier 150 to ground. Thus, when the input power is to be changed, contact 292 will be closed through linkage 294, which causes timer 292 to close its contacts 284 and 293 for a predetermined time period, regardless of the subsequent position of contact 292. Relay coil 288 is thus connected to source potential 236, closing relay contact 290, which grounds the output of the operational amplifier. At the end of the timed period, timer contacts 284 and 293 open, and relay contact 290 opens to remove the ground. Timer 282 resets to await the next change in input power. Although shown with mechanical components, the de-activating means 280 may be completely static, if desired.

In the operation of the complete electrical system shown in FIG. 3, prime mover 208 is set to deliver a predetermined power input to shaft 210 of alternating current generator 10. The setting of the input power automatically deactivates stabilizer circuit 70 for a predetermined period of time necessary to insure the completion of the input power adjustment, and also automatically provides a reference potential for the particular power input setting through means 160 for operational amplifier 150, which adjusts operational amplifier 150 to provide a zero output when the output power of alternating current generator 10 corresponds to the level of the input power. Potential transformer means 32 provides a measure of the output voltage of alternating current generator 10, which is rectified in voltage sensing means 28, compared with a reference standard in voltage reference means 30, and any difference between the voltage sensing signal $V_0$ and the desired magnitude as determined by voltage reference means 30, appears as an error signal $E_S$ which is amplified in preamplifier 250 and applied to firing circuit 252. Firing circuit 252 provides phase modulated firing pulses which renders bridge rectifier arrangement 200 conductive for a predetermined portion of each positive half cycle, to provide an average excitation current in the exciter field winding 212 which will enable exciter 202 to deliver the necessary average excitation current to maintain the terminal voltage of alternating current generator 10 at the desired magnitude.

Now, assume that a transient disturbance on the electrical system increases the generator load angle, which lowers the terminal voltage of the alternating current generator 10 and increases the instantaneous real power output of the generator. The output signal $V_0$ from voltage sensing means 28 will drop sharply, and the instantaneous real power output, as developed through watt transducer means 120 and 122, will increase sharply, driving the operational amplifier away from its balance point, and providing an output stabilizing signal at terminal 90 which is positive with respect to ground. The output signal of operational amplifier 150 is developed across resistance means 50, with the polarity of the stabilizing signal adding to voltage sensing signal $V_0$. The level of the modified signal applied to voltage reference means 30 may be substantially the same value that it was immediately prior to the system disturbance, if desired. The system disturbance is, therefore, not transmitted from the voltage regulator system into the excitation system, and the inherent damping action of the alternating current generator 10 will quickly dampen rotor oscillations initiated by the system disturbance, without interference from the regulator system.

On a transient disturbance which causes the generator load angle to decrease, the terminal voltage will increase and the instantaneous power output from the alternating current generator will decrease. The output signal $V_0$ from voltage sensing means 28 will increase, the operational amplifier 150 will be driven away from its balance point, and terminal 90 of the operational amplifier will be more negative than ground, which develop a stabilizing signal across resistance means 50 whose polarity opposes that of the voltage sensing signal $V_0$. Thus, the signal applied to voltage reference means 30 is less than signal $V_0$ by the amount of the stabilizing signal, and the modified signal may be made to be substantially the same as the magnitude of $V_0$ immediately preceding the system disturbance. Therefore, any rotor oscillations caused by the system disturbance may be dampened by the alternating current generator without an opposing effect from the regulator system.

FIG. 4 is a diagrammatic representation of another embodiment of the invention, with like reference numerals in FIGS. 2 and 4 indicating like components. The embodiment of the invention shown in FIG. 4 provides a stabilizing signal proportional to the change in the real power output of generator 10, but unlike the embodiment of FIG. 3, does not require a reference signal responsive to the input power to the generator.

More specifically, stabilizing means 70 includes a watt transducer 300, which may be similar to the Hall generator watt transducer arrangement shown in FIG. 3, a low impedance amplifier 302, and capacitor means 304. Watt transducer 300 is connected to current transformers 72 and 74 at terminals 77, 81 and 83, and to potential transformer 32 at terminals 84, 86 and 88. Watt transducer 300 provides a unidirectional output voltage at its output terminals 85 and 87 which is responsive to the magnitude of the instantaneous real power output of generator 10. The output signal from watt transducer 300 is applied to input terminals 89 and 91 of amplifier 302, and the amplified signal is applied across resistor 50 from terminals 93 and 95, through capacitance means 304. As long as the power output of generator 10 is stable, capacitor 304 will be charged to a predetermined potential, and no stabilizing signal will be developed across resistor 50. If the output power of generator 10 changes, either in the increasing or decreasing direction, a stabilizing signal will be developed across resistor 50, with the polarity of the signal being determined by the direction of the power change. If the generator power output increases, capacitor 304 will charge to a higher potential, and the direction of current flow through resistor 50 will provide a signal having a polarity which adds to the signal from voltage sensing means 28. If the power output decreases, capacitor 304 will discharge to the lower potential, and the direction of current flow through resistor 50 will provide a stabilizing signal having a polarity which is in opposition to the signal from voltage sensing means 28.

Care should be taken to select the values of capacitance means 304 and resistor 50, to provide a stabilizing signal across resistor 50 which is proportional to the change in the power output of generator 10, and not the rate of change, as the latter would introduce an undesirable phase shift into the signal.

In summary, there has been disclosed a new and improved electrical control system for a dynamoelectric machine, which includes stabilizing means for preventing the voltage regulator of its control system from cancelling the inherent damping action of the machine on rotor oscillations produced by transient disturbances in the electrical system. The stabilizer means accomplishes this result without degrading the response of the regulator portion of the system, which makes it compatible with modern high speed regulator and excitation systems. The stabilizer system thus permits the maximum transient and dynamic stability of the alternating current generator to be realized, without hunting, and at the same time allows the voltage regulator to hold the desired terminal voltage during normal changes in output voltage due to changes in reactive power but involving little or no change in real power output.

Since numerous changes may be made in the above-described apparatus and different embodiments of the invention may be made without departing from the spirit thereof, it is intended that all matter contained in the the foregoing description or shown in the accompanying drawings, shall be interpreted as illustrative, and not in a limiting sense.

We claim as our invention:

1. A control system for a dynamoelectric machine driven by prime mover means, and having a field excitation winding, and output terminals connected to an electrical system, comprising:

excitation means having output terminals adapted to supply excitation current to the field winding of the dynamoelectric machine, and input terminals;

regulator means having input terminals adapted to obtain a signal responsive to the output terminal voltage of the dynamoelectric machine, and output terminals for providing an output signal responsive to any difference between the output terminal voltage of said dynamoelectric machine and a predetermined magnitude;

the output terminals of said regulator means being connected to the input terminals of said excitation means, with the output signal of said regulator means controlling the magnitude of the excitation current in the field excitation winding of the dynamoelectric machine, and stabilizer means for preventing said regulator means from cancelling the inherent damping of the rotor of the dynamoelectric machine during a transient system disturbance said stabilizer means comprising first means for providing a measure of the instantaneous voltage and current output of the dynamoelectric machine, second means connected to said first means providing a signal directly responsive to the instantaneous real power output of the dynamoelectric machine, third means connected to said second means, providing a polarized stabilizing signal when the instantaneous real power output changes from its normal steady-state value, said stabilizing signal being directly responsive to the change in power output with the polarity of the stabilizing signal indicating the direction of the power change, and means connecting said third means to said regulator means, with the stabilizing signal modifying the output signal of said regulator means to oppose the reaction of the regulator means to the system disturbance.

2. The control system of claim 1 wherein the regulator means includes voltage sensing means which provides a unidirectional sensing signal responsive to the output voltage of the dynamoelectric machine, impedance means, and voltage reference means, said voltage sensing means applying the unidirectional sensing signal to said reference means through said impedance means, said reference means providing the output signal of the regulator means, the stabilizing signal provided by the third means being applied across said impedance means, to modify said unidirectional sensing signal with the stabilizing signal during a system disturbance.

3. The control system of claim 1 wherein the regulator means includes impedance means connected between the output terminals of the regulator means and the input terminals of the excitation means, the stabilizing signal provided by the third means being applied across said impedance means, to modify the output signal of the regulator means with the stabilizing signal during a system disturbance.

4. The control system of claim 1 including means connected to the stabilizer means adapted to be responsive to changes in input power to the dynamoelectric machine by the prime mover means, said means de-activating said stabilizer means during the time the input power to the dynamoelectric machine is being charged.

5. The control system of claim 1 including means adapted to be responsive to changes in input power to the dynamoelectric machine, said means being connected to the stabilizer means to provide a reference signal for establishing a zero output from the stabilizer means when the instantaneous real power output of the dynamoelectric machine corresponds to the input power to the dynamoelectric machine.

6. The control system of claim 1 wherein the second means of the stabilizer means includes watt transducer means and the third means includes operational amplifier means, said watt transducer means providing a measure of the instantaneous real power output of the dynamoelectric machine, said watt transducer means being connected to said operational amplifier means, and means balancing said operational amplifier means to provide a zero output when the instantaneous real power output of the dynamoelectric machine corresponds to the level of input power, said operational amplifier means providing polarized stabilizing signals when the instantaneous real power output of the dynamoelectric machine is less than, and greater than the level of input power to the dynamoelectric machine.

7. The control system of claim 6 including switching means connected between the operational amplifier means and ground, said switching means being adapted to be responsive to a change in the input power to the dynamoelectric machine, to connect the output of the operational amplifier to ground during the change in the input power.

8. The control system of claim 1 wherein the second means of the stabilizer means includes watt transducer means, and the third means includes capacitor means, said watt transducer means providing a unidirectional potential responsive to the instantaneous real power output of the dynamoelectric machine, said watt transducer means being connected to said regulator means through said capacitor means, said capacitor means providing a polarized stabilizing signal responsive to the change, and direction of change, in the power output of the dynamoelectric machine.

9. The control system of claim 8 wherein the regulator means includes voltage sensing means adapted to be connected to the output terminals of the dynamoelectric machine, voltage reference means, and impedance means, said voltage sensing means being connected to said voltage reference means through said impedance means, said voltage reference means being connected to said excitation means, with the unidirectional output potential of the watt transducer means being connected across said impedance means through the capacitor means.

10. The control system of claim 8 wherein the regulator means includes impedance means connected between its output terminals and the input terminals of the excitation means, with the watt transducer means being connected across said impedance means through the capacitor means.

References Cited

UNITED STATES PATENTS

| 2,981,882 | 4/1961 | Rosenblatt | 322—24 |
| 3,054,952 | 9/1962 | Lehrmann. | |
| 3,211,987 | 10/1965 | Gatlin et al. | 322—24 |
| 3,243,596 | 3/1966 | Loft | 290—40 |

OTHER REFERENCES

Sauber.—Audio Frequency Power Measurements Using the Hall Effect, the Right Angle, February 1964, p. 4.

ORIS L. RADER, Primary Examiner

H. HUBERFELD, Assistant Examiner

U.S. Cl. X.R.

290—40; 322—24, 25, 28, 36